Jan. 3, 1928.
J. O. GARGAN
1,655,054
ADJUSTING AND LOCKING DEVICE
Filed Feb. 2, 1921
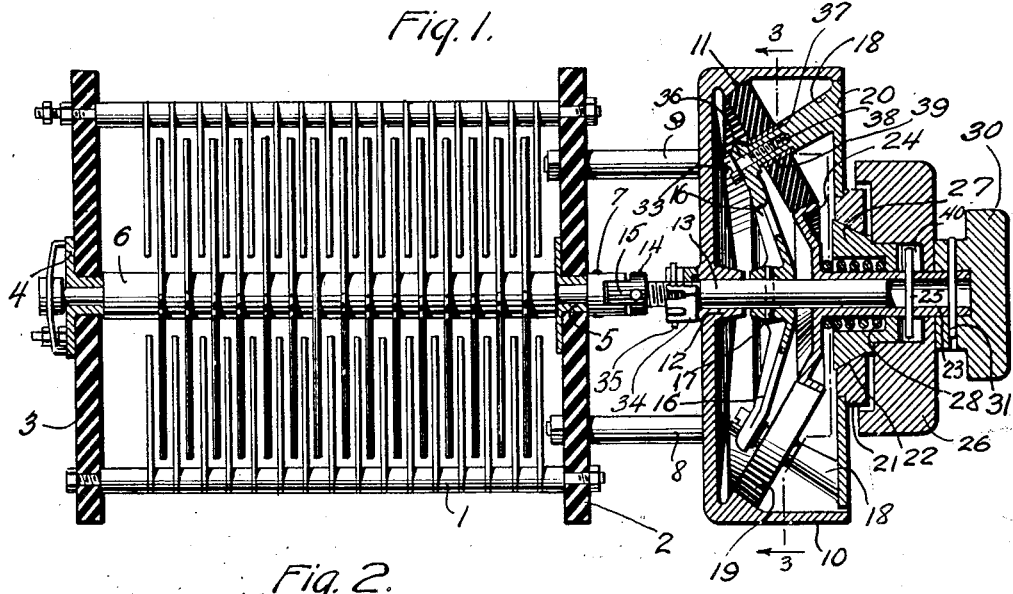
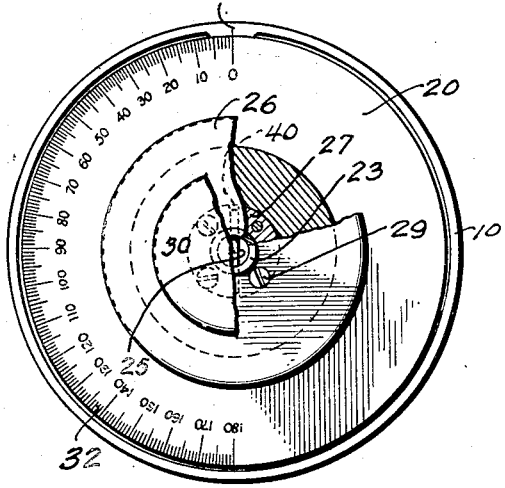
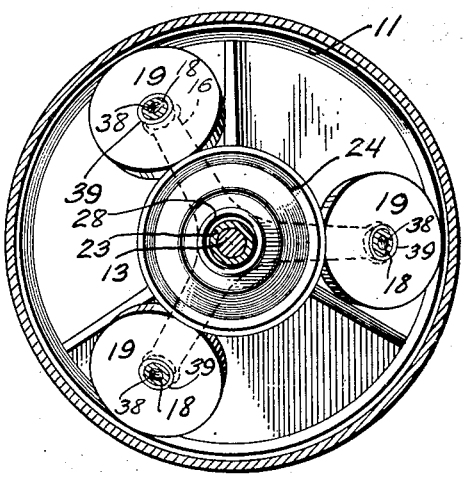
Inventor:
John O. Gargan,
by Joel W. Palmer
Att'y.

Patented Jan. 3, 1928.

1,655,054

UNITED STATES PATENT OFFICE.

JOHN O. GARGAN, OF BROOKLYN, NEW YORK, ASSIGNOR TO WESTERN ELECTRIC COMPANY, INCORPORATED, OF NEW YORK, N. Y., A CORPORATION OF NEW YORK.

ADJUSTING AND LOCKING DEVICE.

Application filed February 2, 1921. Serial No. 441,732.

This invention relates to a device for making adjustments in condensers, inductometers or the like and means for locking the device in any desired position.

The object of this invention is to produce a simple, compact device, smooth in action and free from backlash whereby rough or fine adjustments in condensers, inductometers or the like may be made independently with accuracy and without disconnecting the device from the apparatus in use, and by which the rotatable elements may be locked in any desired position.

The fine adjustments in this device are obtained by the use of a planetary system of conical rollers to obtain the required speed ratios. This system provides a roller speed transmission that is free from backlash and slippage and is self compensating for wear.

The invention will be more clearly understood from the following detailed specifications and accompanying drawings. Figure 1, is a cross section of the device showing it attached to a condenser.

Fig. 2 is a top plan view with parts broken away in order to show some of the different members.

Fig. 3 is a cross section along line 3—3, Fig. 1.

In Fig. 1, a variable air condenser 1 has bearings 4 and 5 in its plates 2 and 3. Mounted in the bearings 4 and 5 is a shaft 6 which has a U-shaped member 7 attached to one end. This member 7 is usually made of insulation material so as to insulate the adjusting members from condenser 1. Carried by the plate 2 are studs 8 and 9 which support a casing 10. Integral with and round the inside of casing 10 is a conical raceway 11. In the bottom of the casing 10 is a bearing 12 in which shaft 13 is journalled. One end of the shaft 13 is threaded and has a threaded collar 34 thereon. This collar 34 may be locked in any desired position by means of pin 35. The collar 34 takes spring reaction and provides adjustment for initial engagement of 11 and 19. Attached to the threaded end of the shaft 13 is a member 14 that has a projection 15 which fits into the U-shaped member 7 and connects the shafts 7 and 13 together.

Idler arms 16 are pinned to the shaft 13 by pin 17. In the end of each idler arm 16 is an opening 36. Screws 33 serve to fix the members 18 to the idler arms 16. Members 18 have bearings 39 rotatably mounted thereon to which planet wheels 19 of a planetary gearing system are attached. These planet wheels are initially held in position against raceway 11 by shoulders 37. The members 18 are provided with internal threads 38 to engage corresponding threads in the screws 33. Plate 20 is carried by member 18 and has a ring member 21 attached thereto. This ring member has a tapered face 22. A sleeve 23 has integral therewith a wheel 24 which serves as a sun wheel of the planetary system mentioned above. This sleeve 23 is slidably and rotatably mounted on shaft 13. Slidably mounted on sleeve 23 is a clutch wheel 27. This clutch wheel has a bevelled face which is normally held in engagement with face 22 of the ring 21 by spring 28 which also presses the sun wheel 24 against the planet wheels 19 and the planet wheels 19 are so mounted on their bearings that they may move forward slightly and thus pressure from the spring 28 is also transmitted to the conical raceway 11. The knob 26 is slidably mounted on sleeve 23 and imparts its circular motion to the sleeve 23 through pin 25 which pin fits into a slot 40 in the knob 26. This slot 40 is deep enough to allow the knob 26 to be moved along the sleeve 23 within its limits of sliding movement and still keep it in engagement with pin 25 to prevent it from being rotated relative to sleeve 23. The knob 26 is attached to clutch wheel 27 by screws 29. The knob 30 is fixed to sleeve 33 by means of pin 31. A circular scale 32, marked in any arbitrary manner, is located on the plate 20 and a mark at 33 made on the casing 10 corresponds with zero on the scale when the condenser is in the position which gives minimum capacity.

The planet wheels 19 are usually made of a material which has a high coefficient of friction but it is not absolutely necessary. The sun wheel 24, clutch wheel 27, ring member 21 and raceway 11 might be made of material which has a high co-efficient of friction but it is not necessary and in fact is not the usual practice.

The planet wheels 19, sun wheel 24 and raceway 11 are all in the form of conic frustums and their lines of engagement if continued would all intersect in a single point in the axis of the shaft. The normal pressure between the members 19, 24 and 11, is greater than the direct pressure of springs 28 and is dependent upon the angles which the lines of their engagement make with the shaft. The normal pressure increases as the lines of engagement approach positions in which they are parallel to the shaft axis.

A modification of this adjusting apparatus may be made by constructing the device with only the planetary system of gearing for making fine adjustments. The operation of the device is as follows:

If it is desirable to make rough adjustments, the knob 30 is drawn upwards thus raising sleeve 23 and compressing spring 28 and removing the sun wheel from the planet wheels 19. The knob 30 is then rotated imparting a circular motion to knob 26 by means of pin 25 and to clutch wheel 27 which is attached to knob 26. The circular motion of clutch wheel 27 is conveyed to ring 21 with which it is frictionally engaged. The ring member 21 is fastened to the plate 20 which is connected through the idler arms and members 18 to the shaft 13. Thus the motion of the knob 30 is conveyed to the shaft 13. The shaft 13 is connected to shaft 6 and so the shaft 6 turns directly as the knob 30.

When it is necessary to make fine adjustments, that cannot be made accurately through the direct transmission of the motion of knob 30, knob 26 is pressed downward forcing clutch wheel 27 out of engagement with the ring member 21 and compressing the spring 28 which increases the pressure between the faces of the sun wheel and planet wheels and the planet wheels and the raceway. This increased pressure is not necessary for satisfactory operation. Knob 26 is then rotated and a motion is directly imparted to the sun wheel 24 which rotates the planet wheels 19. The planet wheels travel around the raceway 11 carrying with them the idler arms 16 and the plate 20 which members are attached to the members 18 on which the planet wheels are mounted. Thus, it is seen that the planet wheels 19 have two motions, one about their own axes and one about the axis of the sun wheel 24 which we will call the planetary movement. The idler arms 16 are rotated according to the speed of the planetary motion and being fixed to the shaft 13 which is connected to shaft 6 conveying such motion to shaft 6. The speed with which the shaft 6 is revolved relative to the speed of knob 26 depends upon the relative diameters of the planet wheels 19 and the sun wheel 24. If the planet wheels and sun wheel are of equal diameter, the shaft 6 will make one revolution for every four revolutions of the knob 26. Hence, it is seen that fine adjustments can be made very accurately with such an arrangement. In case greater accuracy is required, the size of the wheels will be varied so that a greater number of rotations of the knob will be required to revolve the shaft once.

When either rough or fine adjustments have been made and the knobs 26 or 30 released, the sun wheel 24 is forced into engagement with the planet wheels 19 and the clutch wheel 27 is moved into engagement with ring member 21 by spring member 28. If it is attempted to rotate knobs 26 or 30 which are both pinned to the sleeve 23, when the device is in the position described above, the clutch wheel 27 tends to rotate the idler arms 16 at a speed equal to that of the knobs and is opposed by the friction of the faces of the sun wheel 24 and the planet wheels 19 and the raceway 11 since the planet wheels 19 tend to move the idler arms at a speed which is less than that of the knobs. Therefore, it is seen, the device is locked in any position as soon as the knobs are released. When the device is constructed so as to provide for fine adjustments only, there is only one knob 26 which is connected as described to the sleeve 23. The sleeve 23 is integral with the sun wheel 24. Hence, the rotary motion of the knob is transmitted directly to the sun wheel 14 which rotates the planet wheels 19. The remainder of the operation is the same as set forth in the paragraph describing how to make fine adjustments.

The angle through which the shaft has been turned is indicated by the scale 32.

What is claimed is:

1. An adjusting and locking device comprising a shaft; a rotative member; means for rotating said shaft directly at an angular speed equal to the angular speed of said rotative member; and means for rotating said shaft at an angular speed proportional to, and in the same direction as, the angular speed of said rotative member, said means cooperating with each other under predetermined conditions to lock said shaft in any desired position.

2. An adjusting and locking device comprising a connected shaft; a rotative member; means for rotating said shaft at the same angular speed as the angular speed of said rotative member; and means for rotating said shaft at an angular speed less than and in the same direction as, the angular speed of said rotative member, said means cooperating with each other under predetermined conditions to lock said shaft in any desired position.

3. An adjusting and locking device comprising a shaft, a rotative member, a clutch wheel directly attached to said rotative member, a ring directly attached to said shaft and which may be frictionally engaged by said clutch wheel to rotate said shaft at the speed of said rotative member, a sun wheel of a planetary train of gearing carried by said rotative member, planet wheels connected to said shaft and operated by said sun wheel to rotate said shaft at a speed less than that of said rotative member, a spring which normally holds said sun wheel in engagement with said planet wheels and said clutch wheel in engagement with said ring to lock said shaft in any desired position.

4. An adjusting and locking device comprising a shaft, a rotative member, a conical clutch wheel attached to said rotative member and which normally engages a member attached to said shaft to rotate the same at a speed equal to that of said rotative member, a planetary train of gearing composed of a conical raceway and conical sun and planet rollers the sun roller being operable by said rotative member to rotate the shaft at a speed less than that of said rotative member, a spring which holds said shaft in engagement with said rotative member through said conical clutch wheel and through said planetary gearing so as to lock the same in any desired position.

5. An adjusting and locking device comprising a shaft, a rotative member, a ring member attached to said shaft, a conical clutch wheel attached to said rotative member, a planetary train of gearing composed of a conical raceway and conical sun and planet rollers, the sun roller being attached to said rotative member and the planetary rollers to said shaft, a spring which holds said conical clutch wheel in engagement with said ring and said sun roller in engagement with said planet rollers with a force which depends on the angle which the lines of engagement make with the axis of said spring and which provides for the wear of the said rollers.

6. An adjusting and locking device comprising a casing, a shaft mounted in said casing, a sleeve rotatively mounted on said shaft, a knob pinned to said sleeve, a clutch wheel directly attached to said sleeve, a ring attached to said shaft and which may be frictionally engaged by said clutch wheel to rotate said shaft at the speed of said knob, a sun wheel of a planetary train of gearing carried by said sleeve, planet wheels connected to said shaft and operated by said sun wheel to rotate said shaft at a speed less than said knob, a raceway for said planet wheels formed integral with said casing, a spring which normally holds said sun wheel in engagement with said planet wheels and said clutch wheel in engagement with said ring to lock said shaft in any desired position.

7. In a device of the character described, a spindle adapted to be angularly adjusted, a sleeve connected with the spindle to rotate therewith, a dial fixed on the sleeve and arranged to be directly turned to effect a rough adjustment of the sleeve, a knob having a shaft journaled centrally of the sleeve, a pinion on said shaft, a ring gear mounted concentrically with the sleeve, and gearing carried by the dial and meshing with said pinion and ring gear.

8. Instrument-adjusting structure comprising a member, a dial rotatable with respect to said member, and a friction wheel carried by and rotatable with respect to said dial and engaging said member at a distance from the axis of rotation of said dial for effecting nice adjustment of said dial.

9. Instrument-adjusting structure comprising a member, a dial rotatable with respect to said member, and a friction wheel carried by and rotatable with respect to said dial engaging said member at a distance from the axis of rotation of said dial, a manually operable member carried by and rotatable with respect to said dial, and means intervening between said manually operable member and said wheel for effecting rotation of said wheel by said manually operable member.

10. The combination with a shaft and a support, of a dial secured to the shaft; a gear fixed to the support; a knob rotatably mounted on the dial, and means on the dial for operatively connecting the gear to the knob.

11. The combination with a shaft and a support, of a sleeve; a dial; means for securing the dial and sleeve to the shaft; a gear fixed to the support; a knob rotatably mounted on the dial; and means on the dial for operatively connecting the gear to the knob.

12. The combination with a shaft and a support, of a dial removably secured to the shaft; a gear fixed to the support; a gear rotatably mounted on the dial and meshing with the fixed gear, and means for rotating the gear on the dial.

13. The combination with a shaft and a support, of a dial secured to the shaft; a gear fixed to the support; a gear rotatably mounted on the dial and meshing with the gear on the support, and a knob rotatably mounted on the dial and operatively connected to the gear on the dial.

14. The combination with a shaft and a support, of a dial removably secured to the shaft; a gear removably secured to the support; a gear rotatably mounted on the dial and meshing with the gear on the support; a pinion rotatably mounted on the dial and operatively connected to the gear on the dial, and means for rotating the pinion.

15. In a device of the class described, the combination of a rotatable dial, a member relative to which said rotatable dial moves, and a rotatable member carried by said dial and arranged at an angle to the axis thereof and engaging the first-mentioned member to effect micrometric adjustments of said rotatable dial.

16. In a mechanism for rotating a dial plate with respect to the surface against which the dial is mounted, a handle member mounted centrally with respect to the dial, an operating member for engaging said surface to propel the dial, means for mounting said member on an axis disposed at an angle to the axis of rotation of the dial, and means for operatively connecting said handle member to said operating member.

In witness whereof, I hereunto subscribe my name this 1st day of February, A. D. 1921.

JOHN O. GARGAN.